(12) United States Patent
Schelin et al.

(10) Patent No.: US 6,251,527 B1
(45) Date of Patent: Jun. 26, 2001

(54) ALCLAD INSET INTO GROOVED INGOT

(75) Inventors: Eric Victor Schelin, Eldridge; Lynn E. Oswald, Bettendorf; Brian C. Reynolds; Cherlyn J. Augenstein, both of Davenport, all of IA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/290,278

(22) Filed: Apr. 13, 1999

Related U.S. Application Data

(60) Provisional application No. 60/082,391, filed on Apr. 20, 1998.

(51) Int. Cl.$^7$ ............................................. B32B 15/20
(52) U.S. Cl. ....................... 428/582; 428/583; 428/614; 428/609; 428/654
(58) Field of Search ................................. 428/614, 609, 428/654, 582, 583; 228/174, 190, 235.2, 235.3; 148/535

(56) References Cited

U.S. PATENT DOCUMENTS

| | | | | |
|---|---|---|---|---|
| 543,192 | * | 7/1895 | Rodig | 428/614 |
| 685,758 | * | 11/1901 | Griffith | 428/614 |
| 2,386,091 | * | 10/1945 | Carlson | 428/614 |
| 2,395,877 | * | 3/1946 | Keene | 428/614 |
| 2,800,709 | * | 7/1957 | Gaul | 228/235.3 |
| 2,932,886 | * | 4/1960 | Althouse | 228/235.3 |
| 2,941,282 | * | 6/1960 | Fromson | 428/654 |
| 2,961,762 | * | 11/1960 | Clark et al. | 228/174 |
| 3,720,503 | * | 3/1973 | Trost | 428/614 |

\* cited by examiner

*Primary Examiner*—John J. Zimmerman
(74) *Attorney, Agent, or Firm*—Charles Q. Buckwalter

(57) ABSTRACT

The present invention is directed to the application of a liner material which is corrosion resistant to a strong and tough core aluminum alloy which has been grooved out creating a liner bed resulting in an Alclad structure.

17 Claims, 1 Drawing Sheet

ALCLAD INSET INTO GROOVED INGOT

RELATED APPLICATIONS

This application claims the benefit of U.S. Provisional Application No. 60/082,391, filed Apr. 20, 1998.

BACKGROUND OF THE INVENTION

The present invention is directed to aluminum alloys that are clad or any other aluminum product covered with a protective aluminum or aluminum alloy ("Alclad") wherein a liner covering is inset into a grooved ingot and subsequently roll bonded to the core alloy to make an integral structure.

A problem in the aerospace alloy art is the corrosion resistance or lack thereof, of certain aerospace alloys that are used to build fuselage structures of today's commercial airlines. Past practice has solved this corrosion problem by cladding or covering the aerospace alloy with an alloy that does not contain the strength or toughness properties of an aerospace alloy but instead provides a significant improvement in corrosion resistance and weathering effects.

As the practice of Alcladding is performed today, an ingot of alloyed aluminum is covered with a higher purity aluminum, for instance a 1xxx series aluminum alloy as designated by the Aluminum Association registration, or simply pure aluminum. As those who come to appreciate the invention hereof will realize this invention can also be applied to the brazing sheet art which generally sandwiches 3xxx and 4xxx alloys. To cover an aerospace alloy such as 2xxx or 7xxx or marine alloy such as the 3xxx, 5xxx, and/or the 6xxx series alloys, the higher purity aluminum must be bonded in some way to the core alloy. This is typically done today by hot rolling. Hot rolling or working the aluminum alloy and Alclad together effectively forces the metal and alloy to combine as a single sandwich structure. As the force and heat of the hot rolls compress the alloy and metal together excess metal cladding peels at the edges of the sandwich structure. This peeling is believed to be inherent to the hot rolling Alclad process due to a difference in yield strength between the harder and tougher core alloy ingot and the Alclad liner material. Nonetheless, the peeling must be removed prior to finishing the hot rolling of the sandwich structure. Failure to remove the peeling will result in product unacceptable to the customer. Having to remove the peeling has proven both an economic and worker safety liability. The need to remove the peeling requires an employee to enter a hot mill area, climb onto the hot mill equipment and lift and remove the peelings. That this can be a significant event is reflected by the conditions at the hot mill. The temperatures of the peelings and Alclad sandwich in this environment can range from 450 degrees F. to 850 degrees F. and the peelings weight may range from 1 pound to as much as 200 pounds.

Working an alloy can mean hot rolling, cold rolling, annealing, solution hot treating, aging, forging, and extruding. Generally, working an alloy means adding energy to the alloy from some source through a process.

Accordingly, the practice described hereof pleads for improvement. Improvement of this practice is the subject of the present invention. Hereof, simplicity of thought has brought this Alcladding process into the realm of reasonability. Replacing the forced Alclad as the metal of least resistance and therefore the metal that peels, the Alclad material of the present invention is protected in the hot rolling process by being inset into a grooved out core alloy and then subsequently hot rolled and/or further worked.

SUMMARY OF THE INVENTION

The present invention is directed to an aluminum alloy integral structure comprised of a rectangularly dimensioned core selected from the group consisting of strong and tough aluminum alloy ingots said core comprised of a single or plurality of grooved out beds which extend essentially the length and width of a face of said ingot either on one side or on both sides of the faces of said core wherein said beds comprise a continuous lip at the perimeter of said core and an inside depth into said face which extends substantially between said continuous lip said depth between about 0.250 to about 2.00 inches which receivably accepts and holds a mateably dimensioned liner wherein said liner communicates with said core to make a sandwich said liner selected from the group consisting of corrosion resistant aluminum or aluminum alloy wherein said sandwich is worked into an integral structure. The invention includes means for grooving out an alloy ingot to make the core thus creating a bed for receivably accepting a liner material. Generally the core is comprised of but not limited to a 1xxx, 2xxx, 3xxx, 5xxx, 6xxx, or 7xxx series alloys as recognized by the Aluminum Association registrations. The 2xxx, 3xxx, 5xxx, 7xxx are preferred as core material. The 2xxx series is the most preferred core alloy especially 2024 and 2524 series alloys. For marine applications the 5xxx series is the most preferred core material, especially 5182 series alloys. For brazing sheet the 3xxx series is most preferred for the core material.

Subsequent to the removal of a layer of core alloy from the ingot thus creating said bed, the grooved out material is replaced with a more highly corrosion resistant aluminum or aluminum alloy. Such alloys but not limited thereto are the 1xxx, 3xxx, 4xxx, and 7xxx series alloys most preferably 1230, 1145, and 7072 series alloys, whose function it is to protect the stronger and tougher, as those terms are known to those skilled in this art, core alloy ingot from environmental conditions, such as those often met by aircraft and/or boats. The core of the ingot is left with a continuously lipped outer border of core material to insure that the Alclad material remains secure in the core bed. While only one side of the core material may be lined with Alclad, sometimes it is preferred to line both sides. The liner and core sandwich which communicate with one another is preheated and subsequently hot rolled making a slab or integral structure. The core material provides the strength required in the finished product and the liner provides the corrosion resistance. This added grooved process produces an Alclad integral structure, which may be either plate or sheet, that is equivalent to the Alclad product produced by the prior art process with the added benefit that workers no longer must peel off excessive liner material and are at less risk on the job.

The grooved area of the ingot may be created by either a molding process for the as-made ingot or may be removed by machining core material out of the ingot asmade by the practice of the art today. The Alclad material, of course, must be appropriately sized for the grooved out area so that essentially no fill-in is required in the grooved out area creating Alclad discontinuities. In a preferred practice of this invention, the weld liners are tack welded on the core ingot to insure communication and the liners banded to the ingot during ingot transport from one location to the next in the mill to prevent the liners from falling off the ingot.

An added benefit of this method of applying Alclad is that higher rates of recovery are obtained. Recovery means that the yield of the Alclad material that goes out the door to the customer is increased. Often as the peeling is made in the prior art process, renegade and uncontrollable peeling pieces would inadvertently find themselves as rolled in discontinuities in the cladded material which would be unacceptable to the customer. By decreasing the amount of peeling created, the yield is increased due to less inadvertent inclusion of these renegade pieces in the final product.

As those in this art appreciate, the grooved and continuously lipped rectangularly dimensioned ingot is two sided. In order to apply the Alclad to both the upper and under side of the core alloy ingot, the groove must be made on both sides of the ingot. In one of its preferred embodiments, the core, then, is a true sandwich with Alclad material communicating with the core on both the upper and underside of the ingot. From time to time only a single side may be fixed with Alclad, especially for the use in some fuselages, marine, or brazing applications. The depth of the grooved out material may be from 0.250" to 2.000", preferably 0.25 to 1.000 inches, it is most preferred for the depth of the groove to be between 0.500 and 0.75. In its most preferred embodiment, the liner material is mated to the core and is substantially the same rectangular dimension as the grooved out bed with respect to thickness and length and width. However, the liner may be both thinner and thicker or bigger and smaller than the grooved out bed. It is preferred to have a single solid piece of mateably dimensioned liner material. However, in certain practices it is preferred to mate two or more different liner materials as a laminated liner to place in the core bed. For example, it is advantageous to laminate a 1xxx series with a 6xxx series alloy for liner material to place in a 2xxx series ingot bed.

DETAILED DESCRIPTION OF PREFERRED EMBODIMENTS

Figure 1:
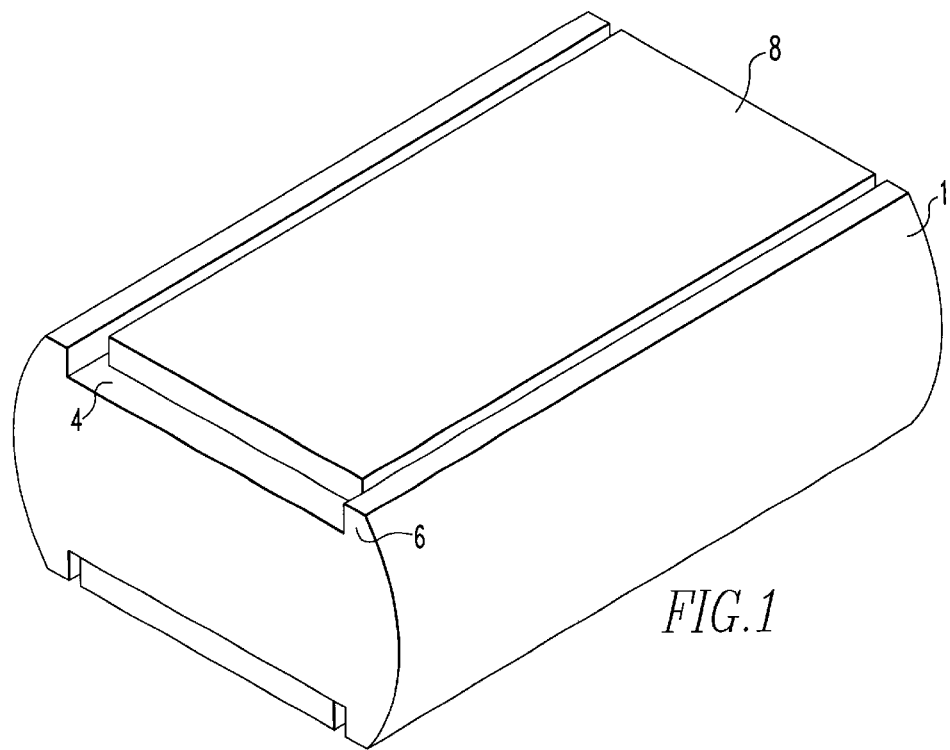
FIG. 1 shows a grooved out ingot and insert Alclad material.

FIG. 1 shows the invention in its simplest terms. The ingot core, 1, is grooved out creating a depression or bed, 4, with a lip, 6, to contain the Alclad material, 8. The Alclad material is inset into the bed, 4, and fit so that the Alclad material size mates with the size of the bed. This mating of Alclad material insert into the bed of the core, 1, provides a sandwich which is subsequently hot rolled compressing the Alclad and ingot core into a unitary integral structure. It is noteworthy that the present invention provides an Alclad structure substantially free of the production of peeling of the Alclad on the lengthwise portions of the ingot since the Alclad is contained by the lip, 6, on either side of the ingot.

Figure 2:
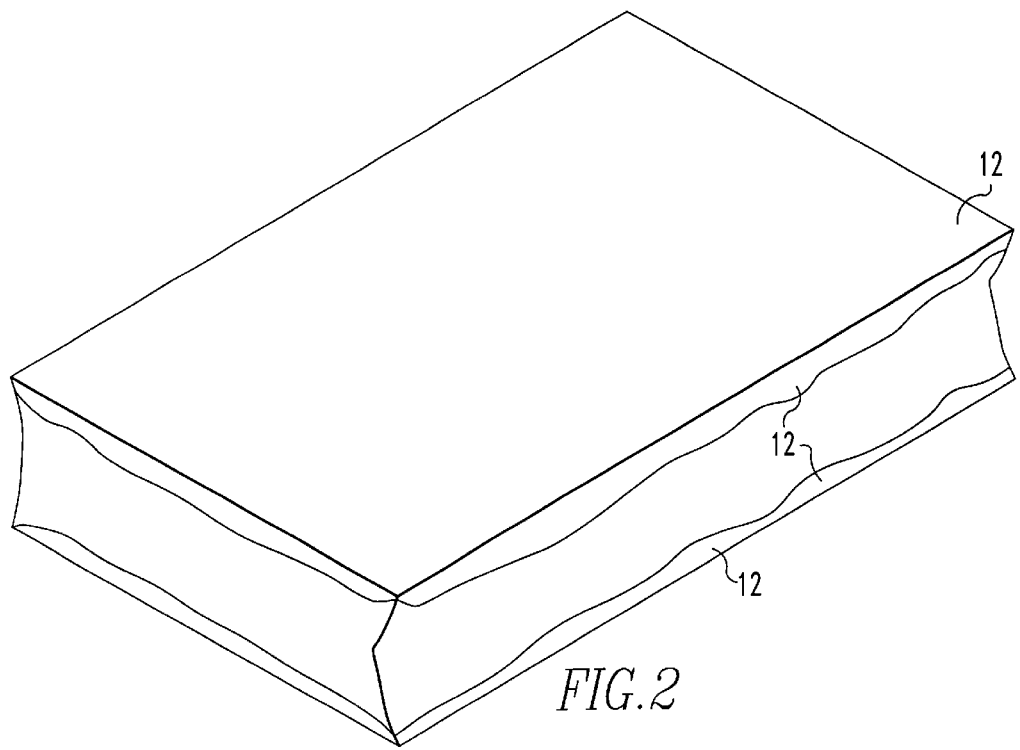
FIG. 2 shows the practice of the prior art.

FIG. 2 shows the prior art process with the side portions exhibiting the peeling, 12, that must be removed after hot rolling. This is the peeling that puts workers at risk due the environmental parameters of the hot rolling station. This peeling must be removed by mechanical means.

In the manufacture of an Alclad structure the core material or ingot was first scalped on both sides of the ingot. Scalping as the name suggests, takes a thin layer off of the ingot of about 0.125 inches of alloy. Next both sides of the scalped ingot were grooved out by machining an interior bed for the liner material. In this example, about 0.625 inches of alloy was machined out from the scalped ingot. A liner of high purity aluminum of essentially equal thickness and size as the grooved out bed in the ingot was placed in the bed. The liner was spot welded in two places to insure that it would not become displaced before or during hot rolling. The welds were placed either on the edge, center length and on the top and bottom of the ingot. Four bands were used to help keep the liner in the groove, two bands in the center and one at each end of the ingot while the ingot was moved to the furnace. Next the ingot was preheated to between 800° F. and 1200° F. The ingot was then moved to the hot roll stand where the hot rolling occurs at between 600° F. and 1100° F. The bands were then cut off of the ingot prior to hot rolling. The ingot and liner was then hot reversed milled. The hot rolling on the reversing mill was continued until continuous mill entry gauge was achieved making a slab. The slab was end sheared to square the ends. The hot rolling was continued through the continuous mill making sheet which was coiled at the exit of the mill. The coiled sheet was then trim edged to remove any edge damage before sending the sheet to be cold rolled. The sheet was then cold rolled to finish gauge. Thereafter the cold rolled sheet can be heat treated to the desired temper and cut to a desired size as product for a customer.

While it is preferred that that the liner material is closely mated to the size of the grooved bed, it is not required in the practice of the invention. The liner may be thinner or thicker than the grooved bed, however, it was found that using a thinner liner did not achieve optimally desirable results.

We claim:

1. An aluminum alloy integral structure comprised of a rectangularly dimensioned core selected from the group consisting of 2xxx and 7xxx Aluminum Association series alloy ingots, the core comprised of a single or plurality of grooved out beds which extend essentially the length and width of a face of the ingot either on one side or on both sides of the faces of the ingot, wherein the beds comprise continuous lips at the perimeter of the core lengthwise sides and an inside depth into the face of the ingot which extends substantially between the lips, the depth into the face between about 0.250 inches to about 2.00 inches which receivably accepts and holds a mateably dimensioned liner wherein said liner communicates with the core, the liner selected from the group consisting of 1xxx and 7xxx Aluminum Association series corrosion resistant aluminum alloys.

2. The structure of claim 1 wherein the core is 2524 Aluminum Association series alloy.

3. The structure of claim 1 wherein the core is 2024 Aluminum Association series alloy.

4. The structure of claim 1 wherein the depth into the face is between about 0.25 inches to about 1.000 inches.

5. The structure of claim 1 wherein the depth into the face is between about 0.500 inches to about 0.750 inches.

6. The structure of claim 1 wherein the liner is 1230 Aluminum Association series alloy.

7. The structure of claim 1 wherein the liner is 1145 Aluminum Association series alloy.

8. The structure of claim 1 wherein the liner is 7072 Aluminum Association series alloy.

9. The structure of claim 1 wherein the core communicates with the liner through welds.

10. The structure of claim 1 wherein the structure is worked by hot rolling.

11. The structure of claim 1 wherein the structure is worked by hot reverse milling.

12. The structure of claim 1 wherein the structure is worked by cold rolling.

13. The structure of claim 1 wherein the structure is worked by solution heat treating.

14. The structure of claim 1 wherein the liner is substantially the same thickness as the bed depth.

15. The structure of claim 1 wherein the liner is a laminate structure.

16. The structure of claim 1 wherein the integral structure is sheet.

17. The structure of claim 1 wherein the integral structure is plate.

* * * * *